Nov. 7, 1967 R. W. BOEHLOW 3,351,115
THREAD-FORMING AND FASTENING SCREW
Filed Nov. 22, 1965

INVENTOR
ROGER W. BOEHLOW
BY
Cohn and Powell
ATTORNEYS

United States Patent Office 3,351,115
Patented Nov. 7, 1967

3,351,115
THREAD-FORMING AND FASTENING SCREW
Roger W. Boehlow, 7115 St. Charles Rock Road,
St. Louis, Mo. 63133
Filed Nov. 22, 1965, Ser. No. 508,980
1 Claim. (Cl. 151—22)

This invention relates generally to improvements in a combination thread-forming and fastening screw, and more particularly to an improved type of tapping screw that forms rather than cuts an internal thread in an untapped hole.

Thread-forming tapping screws produce a secure connection by displacing and deforming the material adjacent to the untapped hole so that the material is shaped into a mating internal thread. Thread-forming tapping screws offer a distinct advantage over the thread-cutting variety in that they produce no residual chips during the threading process. This advantage is of significance when the screws are driven into incomplete holes from which residual chips are irretrievable.

Most of the tapping screws presently in use have the disadvantage that the torque necessary to drive such screw increases with the depth to which the screw is driven. Those screws which tend to minimize this disadvantage invariably do so at the expense of thread-stripping capability or by having an unusual thread configuration that is expensive to manufacture.

An important object of the present invention is to provide a thread-forming and fastening screw that acts as a permanent fastener and which remains secure even under vibrating conditions.

Another important object is achieved by the provision of a thread-forming screw that requires a relatively low, substantially constant driving torque for installation.

A further important object is realized by the provision of a continuous external thread on the shank of the screw, the external thread including a helical thread-forming turn and a plurality of helical thread-holding turns, the thread-forming turn being located forwardly of and adjacent to the thread-holding turns.

An important objective is afforded by the structural arrangement in which the helical thread-forming turn has a crest diameter greater than the crest diameter of the plurality of helical thread-holding turns, and in which the helical thread-holding turn has a crest diameter greater than the root diameter of the thread-forming turn, the thread-forming turn providing an internal thread in an untapped hole with which the thread-holding turns are interconnected substantially without torsional binding.

Another important objective is attained by the construction of the thread-forming turn with substantially the same basic form of thread as, but larger than, the thread-holding turns located rearwardly on the shank so that the thread-holding turns move into and interconnect with the mating internal thread formed by the thread-forming turn, without torsional binding.

Yet another important object is provided by the provision of one or more thread-forming turns on the shank forwardly of and adjacent to the thread-holding turns, the number of thread-forming turns being determined by the constant driving torque required to form the continuous internal thread.

An important object is achieved in that the continuous external thread has a constant pitch, and in that the thread-holding turns located rearwardly and adjacent to the thread-forming turn are unified screw threads, and in that the thread-forming turn has a basic form of thread that is larger than the unified screw thread and is adapted to provide a continuous internal thread in an untapped hole with which the unified screw threads are operatively interconnected substantially without torsional binding.

Another important object is realized by the provision of a thread-forming turn in a screw of the type mentioned previously, which has the same basic form of thread as, but larger than the unified screw threads located rearwardly of and adjacent to the thread-forming turn. This construction provides a mating internal, unified screw thread in the hole that operatively interconnects with the unified screw threads on the shank rearwardly of the thread-forming turn.

Still another important object is afforded by the provision of a tapping screw which, because of the relatively low driving torque, does not require case hardening in some applications.

An important object is attained by the provision of an embryonic lead-in portion for the thread-forming turn which aids in aligning the screw and assists in the commencement of the thread-forming process.

Another important object is provided by a screw having a continuous external thread having substantially full engagement with a mating, internal thread in a workpiece, whereby to provide maximum resistance to stripping, the external thread having only a limited number of thread-forming turns in order to achieve a constant driving torque in forming the mating internal thread that operatively interconnects, substantially without torsional binding, with the helical remaining turns which are smaller than and located rearwardly of the thread-forming turns.

It is an important object to provide a combined thread-forming and fastening screw that is simple and durable in construction, economical to manufacture, highly efficient in operation, and which can be readily installed by any one with little or no instruction.

The foregoing and numerous other objects and advantages of the invention will more clearly appear from the following detailed description of the preferred embodiment, particularly when considered in connection with the accompanying drawing, in which.

Figure 1:
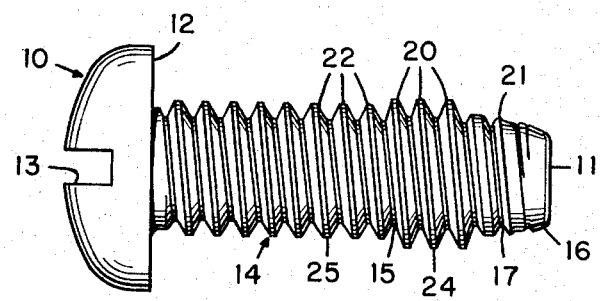
FIG. 1 is a side elevational view of the screw.

Referring now by characters of reference to the drawing, and first to FIG. 1, it will be apparent that the screw consists generally of a head 10 and an integral, elongate shank 11. As is usual, the head 10 is provided with a shoulder 12.

Formed in the screw head 10 is a slot 13 adapted to accommodate a screw driver. It will be understood that the nature of this invention allows the screw to be used with a variety of head constructions suitable for installation by means of a screw driver, wrench or any other means. Furthermore, the screw does not require an enlarged head 10. For example, the screw can be used as a set screw. The present embodiment illustrates only one type of head 10 with which the screw may be provided.

The shank 11 is provided with a continuous, external thread generally indicated by 14, along its length. The external thread 14 has a constant pitch. The root diameter 15 of the external thread 14 lies on a cylindrical plane formed concentric to the longitudinal axis of shank 11. This cylindrical plane has a constant radius throughout its length except that at the tapered shank nose 16, constituting a pilot lead-in end, the radius is progressively decreased so that the root diameter 17 on the shank nose 16 lies on a conical plane.

The continuous, external thread 14 includes one or more thread-forming turns 20 (a total of three complete turns in the embodiment illustrated) on the shank 11 just rearwardly of and adjacent to the tapered shank nose 16. A pilot, lead-in thread 21 formed on the shank nose 16 is an embryonic forming-thread that has a progressively increasing depth axially of the external thread 14 from the shank nose 16 to a maximum depth approaching, yet not exceeding, the depth of the foremost thread-forming turn 20 into which the lead-in thread 21 merges in smooth transition.

The continuous, external thread 14 includes a plurality of thread-holding turns 22 located rearwardly of and adjacent to the thread-forming turns 20. The thread-forming turns 20 and the thread-holding turns 22 have the same root diameter 15. The thread-forming turns 20 have a crest diameter 24 that is greater than the crest diameter 25 of the rearwardly located, thread-holding turn 22. The depth of the thread-forming turns 20 is substantially constant throughout their axial length. The depth of the thread-holding turns 22 is substantially constant throughout their axial length. There is a smooth transition where the rearmost thread-forming turn 20 merges with the foremost, relatively smaller thread-holding turn 22.

The thread-forming turns 20 have substantially the same basic form of thread as the thread-holding turns 22, except that the thread-forming turns 20 are slightly larger. The depth is greater, yet the flank angles are substantially the same. The basic form of thread is defined as the theoretical profile of the thread for a length of one pitch in an axial plane.

In the preferred embodiment, the thread-holding turns 22 are unified standard threads. The standard screw system is in use in the United States, the United Kingdom and Canada. At the present time in the unified screw thread system there are eleven standard series of threads, classified and distinguished by the number of threads per inch on a given diameter. They are: Coarse-thread series, fine-thread series, extra-fine-thread series, four-thread series, six-thread series, eight-thread series, twelve-thread series, sixteen-thread series, twenty-thread series, twenty-eight-thread series, and thirty-two-thread series.

Figure 2:
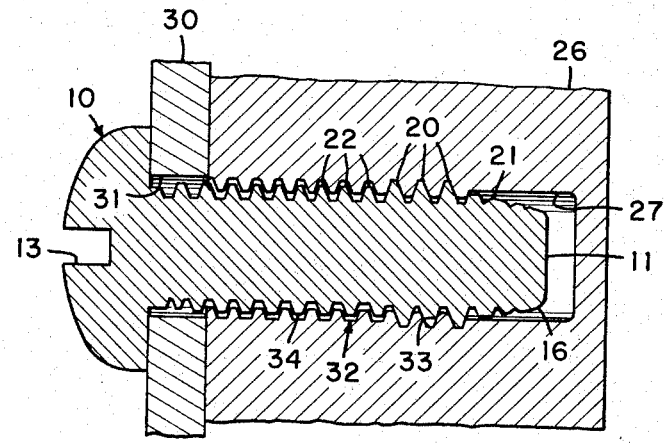
FIG. 2 is a cross-sectional view showing the screw installed.

FIG. 2 illustrates a connection utilizing the present combined thread-forming and fastening screw. The assembly includes a workpiece 26 in which an incomplete, untapped hole 27 is formed. The diameter of hole 27 is greater than the root diameter 15 of the thread-forming turns 20 and the thread-holding turns 22, yet is less than the crest diameter 24 of the thread-forming turns 20.

A plate 30, attached to the workpiece 26 by the screw, has an aperture 31 aligned with the opening of hole 27 to receive the screw shank 11.

Upon insertion of the screw shank 11 into the hole 27, the thread-forming turns 20 deform the material of the workpiece 26 defining the hole 27 to provide an internal thread generally indicated by 32. It will be understood that the thread-forming turns 20 are in constant pressure contact during formation of the internal thread 32.

Figure 3:
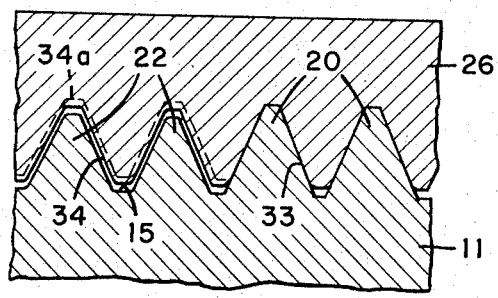
FIG. 3 is an enlarged, fragmentary cross-sectional view, illustrating the formation and connection of the external screw threads with the mating internal thread.

For example, in FIG. 3, it will be understood that the internal thread portion 33 is in pressure engagement with the thread-forming turns 20. The rearwardly located, internal thread portion 34 formed by and unoccupied by the thread-forming turns 20 mate and interengage with the thread-holding turns 22 with a clearance fit substantially without any torsional binding. This interengagement of the thread-holding turns 22 with the mating, internal thread portion 34 does not increase the torque. The torque is constant and is determined by the pressure engagement of the thread-forming turns 20 with the workpiece material incident to forming the internal threads 32.

The comparatively larger size or profile of the thread-forming turns 20 relative to the size or profile of the thread-holding turns 22 is designed so as to insure that when the pressure exerted on the material adjacent to the hole 17 by the thread-forming turns 20 is relieved, the inherent recuperative characteristic of such material will result in a mating, internal thread portion 34 having a clearance fit with the thread-holding turns 22. This residual, recuperative deformation is illustrated by comparison of the original internal thread portion 34a, shown in broken lines in FIG. 3, as initially formed by the thread-forming turns 20, with the resultant configuration of internal thread portions 34, shown in full lines, after the pressure on the deformed and compressed material has been relieved and the material has slightly expanded as a result of the inherent recuperative characteristic.

If the thread-holding turns 22 are unified standard threads, as mentioned previously, the thread-forming turns 20 are of a larger size or profile so that the resultant internal thread portions 34 are cooperating internal unified screw threads that engage the external unified screw threads with substantially no torsional binding. After the compressive force on the internal thread 32 by the thread-forming turns 20 has been removed by axial passage of such thread-forming turns 20, the formed internal thread portion 33 will reduce down to the desired size and profile to afford the resultant internal thread portions 34 that coact with the thread-holding turns 22 behind the thread-forming turns 20 in the manner described.

It is thought that the functional advantages of the combined thread-forming and fastening screw have become fully apparent from the foregoing detailed description of parts, but for completeness of disclosure, the installation of the screw will be briefly described. It will be assumed that the workpiece 26 is provided with the incomplete hole 27 and that the plate 30 is held contiguous to the workpiece 26 with the aperture 31 aligned with the opening of the incomplete hole 27.

The shank 11 of the screw is inserted into and through the plate aperture 31 and the shank nose 16 is inserted partially into the hole 27. Upon application of torque to the screw head 10, as by example, by placing a screw driver in the head slot 13 and turning the head 10, the embryonic forming thread 21 on the tapered shank nose 16 compresses and deforms the material of the workpiece 26 defining the hole 27 to form an embryonic mating thread, the helical construction of the embryonic forming thread 12 propelling the shank 11 into the hole 27 under the applied torque. Continued and increased application of torque forces the screw shank 11 further into the hole 27 resulting in the eventual engagement of the thread-forming turns 20. When all of the thread-forming turns 20 are engaged in the material of the workpiece 26 defining the hole 27, the torque will reach a maximum value. When this depth of penetration by the screw shank 11 into the hole 27 is achieved, the application of a substantially constant torque equivalent to the maximum value, will be sufficient to complete the installation of the screw.

As the thread-forming turns 20 deform the material adjacent hole 27, the material wraps around the thread-forming turns 20 with zero tolerance and under pressure to form the internal thread portion 33. As the screw shank 11 moves axially into the hole 27, the pressure exerted on the material by the thread-forming turns 20 is relieved as the thread-forming turns 20 pass by. Because of the inherent recuperative characteristic of the material, the material will expand slightly or tend to return to its original shape upon removal of such pressure with the consequence that the mating thread lands will tend to increase in width and decrease in depth, while the thread grooves will tend to decrease in width and decrease in depth, as will be understood by a comparison of the initially formed, internal thread portion 34a (shown in broken lines) with the resultant internal thread portion 34 (shown in full lines). The differences between the internal thread portions 34 and 34a are exaggerated in FIG. 3 to emphasize and clearly show this phenomenon.

Because the resultant internal thread portion 34 mates with the coacting thread-holding turns 22, the thread-holding turns 22 move into and operatively interengage with the internal thread portion 34 with a tolerance fit with substantially no torsional binding action that would increase the torque required to insert the screw. Therefore, the torque requirement is readily calculable as determined solely by the deforming action and engagement of the particular thread-forming turns 20 with the workpiece material adjacent the hole 27. The interengagement of the thread-holding turns 22 with the internal thread portion 34, in cooperation with the interengagement of the thread-forming turns 20 with the coacting internal thread portion 33, serve to hold the screw shank 11 in the hole 27 and preclude axial withdrawal. Upon complete insertion of the screw, the head shoulder 12 engages the plate 30 and clamps the plate 30 securely to the workpiece 26.

The present screw provides an internal thread 32 in an untapped hole 27 without creating any chips.

The thread-forming turns 20 located forwardly of the thread-holding turns 22 form the internal threads 32 by a compressive deformation under a torque requirement that is constant and which can be readily calculated in view of the number of thread-forming turns and the degree of hardness of the workpiece material adjacent the hole 27.

The thread-holding turns 22 located immediately adjacent and rearwardly of the thread-forming turns 20 move into and interconnect with the resultant internal thread portion 34 formed by the thread-forming turns 20, such interconnection occurring without any binding that would increase the torque requirement to install the screw, yet serving effectively to preclude axial withdrawal of the screw. Preferably, the resultant internal thread portion 34 mates with a predetermined tolerance fit with the thread-holding turns 22 for maximum, efficient holding action. As an example, the thread-holding turns 22 can be unified standard threads that interengage with a predetermined tolerance fit with compatible internal, unified standard threads 34 formed by and resulting from the compressive deforming action of the relatively larger thread-forming turns 20.

Although the invention has been described by making detailed reference to a single preferred embodiment, such detail is to be understood in an instructive, rather than in any restrictive sense, many variants being possible within the scope of the claim hereunto appended.

I claim as my invention:

A combination thread-forming and fastening screw, comprising:
 (a) a shank, and
 (b) a continuous external thread of constant pitch on the shank including a helical thread-forming portion which operates by plastic deformation of a preformed, unthreaded hole, and
 (c) a plurality of helical thread-holding turns having a constant crest diameter smaller than the crest diameter of the thread-forming portion,
 (d) the thread-forming portion including one or more thread-forming turns of constant crest diameter on the shank forwardly of and adjacent the thread-holding turns as determined by the constant driving torque required to deform the unthreaded hole, the thread having a substantially constant root diameter throughout the thread-forming and thread-holding turns, the leading end of the screw forwardly of and adjacent the thread-forming portion being tapered away from the thread-forming portion and having a continuation of the thread thereon which gradually increases in depth in the direction of the thread-forming portion to merge therewith.

References Cited

UNITED STATES PATENTS

| | | | |
|---|---|---|---|
| 2,269,476 | 1/1942 | Poupitch | 85—46 |
| 2,380,944 | 8/1945 | Cole | 151—14 |
| 3,079,968 | 3/1963 | Buckley | 85—47 |

CARL W. TOMLIN, *Primary Examiner.*

R. S. BRITTS, *Assistant Examiner.*